United States Patent Office 3,140,183
Patented July 7, 1964

3,140,183
FLUIDIZED BED COOKING PROCESS
Herman Nack, Columbus, Ohio, assignor, by mesne assignments, to International Milling Company, Minneapolis, Minn., a corporation of Delaware
No Drawing. Filed June 4, 1963, Ser. No. 285,247
12 Claims. (Cl. 99—1)

This invention relates to a process for treating food by immersing it in a fluidized bed of solid, discrete particles. More particularly, this invention relates to an improvement in the process of cooking food in a fluidized bed as set forth in U.S. Patent 3,035,918 to Sorgenti et al.

A fluidized bed is, by definition, a mass of solid particles that exhibits the liquidlike characteristics of mobility, hydrostatic pressure, and an observable upper free surface or boundary zone across which a marked change in concentration of particles occurs. A fluidized bed system is created by passing a stream of gas or liquid upwardly through a mass of solid particles. As the velocity of the fluid increases, the pressure drop through the bed mass rises until it approaches the net effective weight of the solid-per-unit area, and the packing arrangement becomes more open so that the bed expands. If the velocity of the gas or liquid stream is increased slightly further, the particles are fully supported and the expanding bed becomes fluidized and exhibits the characteristics noted above. Upon further increase in velocity of the gas or liquid, the mass becomes turbulent and mixing of the mass of solids takes place.

In U.S. Patent 3,035,918, there is described a process for cooking food wherein the food product to be cooked is immersed in a fluidized bed of hot, solid, discrete particles. The process is described in particular with respect to the cooking of potato slices to prepare potato chips or "French-fried" potatoes. In preparing potato chips in a fluidized bed cooking process, it sometimes happens that the solid, discrete particles forming the bed adhere to, or coat, the potato slices. This is desirable to some extent for some situations where, for example, the solid, discrete particles are of a material which is also a food product or a seasoning agent. However, in other instances this coating is not desirable, or it may be undesirable to have the coating uncontrolled, or to have the coating occur to more than a very limited extent.

It is, therefore, an object of this invention to provide a method of treating potato slices preparatory to cooking in a fluidized bed of hot, solid, discrete particles thereby providing control over, or elimination of, adherence of such solid, discrete particles to the cooked potato product.

It is a further object of this invention to provide a method of treating food products preparatory to cooking them in a fluidized bed of hot, solid, discrete particles whereby adherence of such solid, discrete particles to the cooked food product is eliminated, or effectively controlled.

Other objects and advantages of the invention will be apparent in view of the following detailed description thereof.

In general, this invention comprises an improvement in the method of cooking foods in a fluidized bed of solid, discrete particles compatible with food products, said improvement comprising coating such foods with a finely divided potato product having a reducing sugar content of less than about 0.5 percent, preparatory to cooking said foods in such fluidized bed.

In preparing food products by cooking them in a fluidized bed of hot, solid, discrete particles, it sometimes happens that the final food product has a number of the solid particles of the bed adhering to it. In many instances, this is desirable as, for example, when the bed particles comprise a seasoning or taste-enhancing material such as salt. Even so, however, it is desirable to be able to limit or control the amount of bed particles adhering to the cooked food product. It was found that this control could be accomplished by coating the food, prior to cooking in the fluidized bed, with a finely divided potato product from the group consisting of potato flour and instant mashed potato powder. Instant mashed potato powder is a commercially available product intended to be cooked (with water added) and eaten as a "mashed" potato. It was found that in some instances the food product, although free of adhering bed particles, was unattractive in appearance, being very brown or even burned-looking. It has now been determined that the undesirable color and excessive crispness can be eliminated by using a coating material comprising a finely divided potato product having a reducing sugar content less than about 0.5 percent.

The reducing sugar content of the various potato products to be used as coating materials was determined as follows: A mixture of approximately 20 percent of the potato product and 80 percent water was prepared. A commercially available tape used for determining reducing sugar content in connection with test for diabetes, etc., was used as the reducing sugar content indicator. A piece of the tape was dipped into the potato-water mixture and after a period of time, as required by the instructions for using the tape, a reading of reducing sugar content was taken. The reading obtained from the tape was multiplied by a factor of five, since the solids content of the test material was only 20 percent. As will be shown in the examples that follow, finely divided potato products having a reducing sugar content of less than about 0.5 percent were satisfactory as coating materials in the process of the present invention. When the reducing sugar content of the potato product was more than about 0.5 percent, food products coated with such potato product prior to cooking in a fluidized bed were generally unsatisfactory in appearing after cooking.

*Examples 1-7*

Commercial instant potato products were purchased and the sugar content of each was determined using the tape test described above. The results were as follows:

|  | Reducing sugar, percent |
|---|---|
| Product A | 0.5–1.25 |
| Product B | 1.25 |
| Product C | 1.25–2.5 |
| Product D | 1.25 |
| Product E | 1.25 |
| Product F | 0.5–1.25 |

Potato slices were then dusted with the above products until coated, cooked in a fluidized bed of sodium chloride for 2½ minutes at 350° F. and compared for color with the following results:

| | |
|---|---|
| Product A | Dark brow edges. |
| Product B | Dark brown—burnt. |
| Product C | Dark brown—burnt. |
| Product D | Medium brown. |
| Product E | Medium brown. |
| Product F | Light brown—spotty. |

A second supply of Product C was obtained and the reducing sugar content of this second batch was determined. The reducing sugar content proved to be very nearly zero, less than 0.1 percent. Potato slices dusted with this instant mashed potato product and then cooked in a fluidized bed of sodium chloride for 2½ minutes at 350° F. were a pleasing golden brown in color when cooked. They were also crisp, but not hard. Repeated cooking runs using the low reducing sugar batch of Product C as the coating material on potato slices cooked in fluidized beds of sodium chloride for periods of time ranging from about 2 to about 4 minutes and at temperatures ranging from about 250° F. to about 500° F. all produced cooked potato products having a pleasing golden color and satisfactory crispness.

It should be noted that Products A, B, C, D, E, and F, as well as the second Product C sample, were effective to prevent adherence of the sodium chloride bed particles to the final potato product.

Before considering further examples, it is desired to explain the apparent discrepancy in regard to the difference in reducing sugar content of the two different batches of Product C. The reducing sugar content of potatoes increases during low temperature storage. New potatoes usually have no reducing sugar or essentially no reducing sugar. Apparently sugar formed while the potato is growing is used up in making tissue. However, in storage at low temperatures reducing sugar is formed by the conversion of starch to sugar by amylolytic enzymes. Thus, instant mashed potatoe products made from new potatoes have low reducing sugar contents. Potatoes that have been stored at low temperatures will have progressively increasing amounts of reducing sugar in proportion to the length of storage. Thus, the reducing sugar content of an instant mashed potato product will depend upon the storage conditions of the potatoes from which it is made, and will not depend upon the particular manufacturer.

*Examples 8–13*

Commercial potato flour products were obtained and their sugar content was determined in accordance with the tape test. The results were as follows:

| | Reducing sugar, percent |
|---|---|
| Flour No. 1 | 0.5 |
| Flour No. 2 | 0–0.5 |
| Flour No. 3 | 0.5–1.25 |
| Flour No. 4 | 0–0.5 |
| Flour No. 5 | 0.5 |

Potato slices coated with these potato flours prior to cooking in a fluidized bed of sodium chloride at a temperature of 350° F. for 2½ minutes gave products characterized as follows:

| | |
|---|---|
| Flour No. 1 | Medium to dark brown. |
| Flour No. 2 | Light brown. |
| Flour No. 3 | Very dark brown. |
| Flour No. 4 | Light brown. |
| Flour No. 5 | Medium to light brown. |

All of these potato flour products were effective to prevent adherence of the sodium chloride particles to the final potato product.

The manner of applying the coating of finely divided potato product on the food to be cooked is not critical. For example, the product may be applied by spraying, dusting or in any other suitable way. A particularly simple, yet satisfactory, method is to place the food slices in a bag containing a substantial amount of the finely divided potato product and then shaking the bag for from a few seconds to about a half minute.

Instant mashed potato products come in many forms and it is to be understood that the term "instant mashed potato powder" is intended to include all of these forms. For example, some instant mashed potato products come in flake form. These are entirely satisfactory for use in the process of this invention although obviously they must first be ground or otherwise reduced to powder form. Similarly other instant mashed potato products can be converted to powder and used in the present process.

Although for illustrative purposes the invention has been described in connection with the cooking of potato slices it is not limited thereto. The cooking of numerous other food products such as bananas, turnips, sweet potatoes, plantain, and others has been effected in a fluid bed using a coating on the food being cooked. Similarly, although the bed particles have been described as sodium chloride in the examples, it is to be understood that other materials compatible with food products would be equally satisfactory. For example, fluid bed particles of sugar, tricalcium phosphate, limestone, limestone-salt mixtures, monosodium glutamate, rice, farina, and barley have all been used successfully for cooking food products.

Improvements in a process for cooking food products in a fluidized bed having been described, it is desired to further define this invention in terms of the appended claims.

This application is a continuation-in-part of my co-pending application Serial No. 195,424, filed May 17, 1962, now abandoned.

What is claimed is:

1. In the method of cooking foods in a fluidized bed of hot, solid, discrete particles compatible with food products, the step of coating such foods with a finely divided potato product having a reducing sugar content of less than about 0.5 percent preparatory to cooking such food in such fluidized bed.

2. In the method of cooking foods in a fluidized bed of hot, solid, discrete particles compatible with food products, the step of coating such foods with a finely divided potato product selected from the group consisting of potato flour and instant mashed potato powder and having a reducing sugar content of less than about 0.5 percent preparatory to cooking such food in such fluidized bed.

3. In the method of cooking potato slices in a fluidized bed of hot, solid, discrete particles compatible with food products, the step of coating said potato slices with a finely divided potato product having a reducing sugar content of less than about 0.5 percent preparatory to cooking such potato slices in such fluidized bed.

4. In the method of cooking potato slices in a fluidized bed of hot, solid, discrete, particles compatible with food products, the step of coating said potato slices with a finely divided potato product selected from the group consisting of potato flour and instant mashed potato powder and having a reducing sugar content of less than about 0.5 percent, preparatory to cooking such potato slices in such fluidized bed.

5. The method of cooking food comprising the steps of slicing the food to be cooked, coating the slices with a finely divided potato product having a reducing sugar content of less than about 0.5 percent, immersing the coated slices in a fluidized bed of hot, solid, discrete particles compatible with food products and removing the cooked slices from the fluidized bed.

6. In the method of claim 5, the step of coating the food slices with a finely divided potato product selected from the group consisting of potato flour, and instant mashed potato powder, and having a reducing sugar content of less than about 0.5 percent.

7. The method of preparing a cooked potato product comprising the steps of slicing the potatoes to be cooked, coating the potato slices with a finely divided potato product having a reducing sugar content of less than about 0.5 percent, immersing the coated slices in a fluidized bed of hot, solid, discrete particles compatible with food products, and removing the cooked potato slices from the fluidized bed.

8. In the method of claim 7, the steps of coating the potato slices with a finely divided potato product selected from the group consisting of potato flour and instant mashed potato powder, and having a reducing sugar content of less than about 0.5 percent.

9. The method of cooking food comprising the steps of slicing the food to be cooked, coating the slices with a finely divided potato product having a reducing sugar content of less than about 0.5 percent, immersing the coated slices in a fluidized bed of hot, solid, discrete particles compatible with food products and selected from the group of compatible materials consisting of sodium chloride, sugar, tricalcium phosphate, limestone, limestone-salt mixtures, monosodium glutamate, rice, farina, and barley, and removing the cooked slices from the fluidized bed.

10. In the method of claim 9, the step of coating the food slices with a finely divided potato product from the group consisting of potato flour and instant mashed potato powder, and having a reducing sugar content of less than about 0.5 percent.

11. The method of preparing a cooked potato product comprising the steps of slicing the potatoes to be cooked, coating the slices with a finely divided potato product having a reducing sugar content of less than about 0.5 percent, immersing the coated slices in a fluidized bed of hot, solid, discrete particles compatible with food products and selected from the group of compatible materials consisting of sodium chloride, sugar, tricalcium phosphate, limestone, limestone-salt mixtures, monosodium glutamate, rice, farina, and barley, and removing the cooked slices from the fluidized bed.

12. In the method of claim 11, the step of coating the potato slices with a finely divided potato product from the group consisting of potato flour and instant mashed potato powder, and having a reducing sugar content of less than about 0.5 percent.

References Cited in the file of this patent
UNITED STATES PATENTS
3,035,918     Sorgenti et al. ---------- May 22, 1962

Dedication 3,140,183.—*Herman Nack*, Columbus, Ohio. FLUIDIZED BED COOKING PROCESS. Patent dated July 7, 1964. Dedication filed Aug. 2, 1974, by the assignee, *The Battelle Development Corporation*.

Hereby dedicates to the People of the United States the entire remaining term of said patent.

[*Official Gazette December 24, 1974.*]